United States Patent
Wietelmann

(10) Patent No.: US 9,166,227 B2
(45) Date of Patent: Oct. 20, 2015

(54) ALUMINUM-BASED HYDRIDE ANODES AND GALVANIC ELEMENTS CONTAINING ALUMINUM-BASED HYDRIDE ANODES

(75) Inventor: Ulrich Wietelmann, Friedrichsdorf (DE)

(73) Assignee: Chemetall GmbH, Frankfurt am Main (DE)

( * ) Notice: Subject to any disclaimer, the term of this patent is extended or adjusted under 35 U.S.C. 154(b) by 174 days.

(21) Appl. No.: 13/497,880

(22) PCT Filed: Oct. 7, 2010

(86) PCT No.: PCT/EP2010/006132
§ 371 (c)(1),
(2), (4) Date: Jul. 31, 2012

(87) PCT Pub. No.: WO2011/042185
PCT Pub. Date: Apr. 14, 2011

(65) Prior Publication Data
US 2012/0288753 A1  Nov. 15, 2012

(30) Foreign Application Priority Data
Oct. 7, 2009 (DE) .................. 10 2009 045 441

(51) Int. Cl.
| | |
|---|---|
| H01M 6/04 | (2006.01) |
| H01M 4/58 | (2010.01) |
| H01M 4/46 | (2006.01) |
| H01M 4/40 | (2006.01) |
| H01M 4/62 | (2006.01) |
| H01M 10/052 | (2010.01) |

(52) U.S. Cl.
CPC ............... *H01M 4/58* (2013.01); *H01M 4/405* (2013.01); *H01M 4/463* (2013.01); *H01M 4/625* (2013.01); *H01M 10/052* (2013.01); *Y10T 29/49108* (2015.01)

(58) Field of Classification Search
CPC ... H01M 10/052; H01M 4/625; H01M 4/463; H01M 4/405
USPC ....................................................... 429/188
See application file for complete search history.

(56) References Cited

U.S. PATENT DOCUMENTS

| | | | |
|---|---|---|---|
| 4,833,046 A | 5/1989 | Roy | |
| 5,567,539 A * | 10/1996 | Takahashi et al. | 429/57 |
| 2008/0286652 A1 | 11/2008 | Nazri et al. | |
| 2009/0311171 A1* | 12/2009 | Lu et al. | 423/648.1 |

FOREIGN PATENT DOCUMENTS

EP  2026390 A2  2/2009

\* cited by examiner

*Primary Examiner* — Jane Rhee
(74) *Attorney, Agent, or Firm* — Norton Rose Fullbright US LLP

(57) ABSTRACT

A hydride anode containing aluminium of the formula $(M^1)_m (M^2)_{3-m} AlH_6$, where $M^1$ and $M^2$ are an alkali element selected independently from one another from Li, Na and K; m is a number between 1 and 3; n is a number $\geq 3$, and galvanic elements, such as lithium batteries, containing as anodes said hydride anodes containing aluminum. Methods for the production of galvanic elements having hydride anodes containing aluminium is also provided.

13 Claims, 3 Drawing Sheets

ALUMINUM-BASED HYDRIDE ANODES AND GALVANIC ELEMENTS CONTAINING ALUMINUM-BASED HYDRIDE ANODES

This application is a §371 of PCT/EP2010/006132 filed Oct. 7, 2010, and claims priority from DE 10 2009 045 441.1 filed Oct. 7, 2009.

PRIOR ART

Currently used rechargeable lithium batteries contain graphite as anode material. Graphite functions as lithium insertion material, and according to the equation $$Li+6C \rightarrow LiC_6$$

has a theoretical capacitance of 372 mAh/g at a potential of approximately 0.2 V relative to Li/Li$^+$. Use cannot be made of the significantly higher storage capacitance of lithium metal (3860 mAh/g) in batteries in practical application, since such batteries are not safe or cyclically stable. During cycling, the lithium metal sometimes separates not in planar form, but in the form of outgrowths (dendrites). These outgrowths may lose physical contact with the metal anode, causing the capacitance of the electrochemical cell to decrease. Even more serious are the consequences when needle-shaped dendrites penetrate the separator. The battery cell may thus be short-circuited, with often catastrophic effects: thermal runaway, usually accompanied by fire.

Therefore, efforts have been made to use metal lithium alloys instead of pure lithium as anode material. However, lithium alloys exhibit extreme fluctuations in volume during incorporation and withdrawal of the lithium (sometimes by several multiples of 100%, for example 238% for Li$_9$Al$_4$). For this reason, alloy anodes have not been commercially successful, with the exception of tin-graphite composites. However, tin is a rare and expensive element, which has prevented the widespread use of materials containing tin.

Tarascon and Aymard have proposed a battery in which lithium hydride is used as the negative electrode (anode) (EP 2026390 A2):

$$MH_x + Li \Leftrightarrow xLiH + M \quad (1)$$

wherein M=La, Mg, Ni, Na, Ti.

However, the Mg-based system described in the above-cited patent document has pronounced hysteresis, and heretofore its functionality has not been demonstrated in an actual lithium battery.

DESCRIPTION OF THE INVENTION

It has surprisingly been found that galvanic elements, for example lithium batteries, which in the discharged state contain a binary or ternary aluminum hydride in the negative electrode composition are stable, and the negative electrode compositions have high lithium intake and release activity. Compounds containing the tetrahydridoaluminate anion (AlH$_4^-$) are not suitable as aluminum hydride. Thus, commercially available LiAlH$_4$ is readily soluble in polar, aprotic solvents such as glycol ethers. In addition, LiAlH$_4$ is a very powerful reducing agent, so that even at room temperature it reacts extremely vigorously with common battery electrolytes containing carbonates, carboxylates, lactones, and/or nitriles. It has surprisingly been found that metal aluminum hydrides containing the hexahydridoaluminate anion (AlH$_6^{3-}$) are insoluble in the named electrolytes and are compatible with same; i.e., a spontaneous reaction does not occur. For this reason, hexahydridoaluminate salts may be used in galvanic cells containing aprotic electrolytes, for example lithium batteries. Due to their low potential relative to Li/Li$^+$, they may preferably be used as anodes (negative electrode).

The lithium charging and discharging process of the negative electrode (anode) may be described by the following equation:

$$(M^1)_m(M^2)_{3-m}AlH_6 + nLi \Leftrightarrow mM^1H + 3 - mM^2H + Al\text{-}Li_{n-3} \quad (2)$$

wherein
M$^1$ and M$^2$ are an alkali element independently selected from Li, Na, and K;
m is a number between 1 and 3; and
n is a number ≥3.

It is particularly preferred that M$^1$=M$^2$=lithium, and n is 3 or 4, particularly preferably 3.

The following discussion concerns this particularly preferred embodiment of the invention; i.e., in the discharged state the anode contains Li$_3$AlH$_6$.

There are various options for using Li$_3$AlH$_6$ as the anode for galvanic elements. Thus, these hydride anodes may be connected to a lithiated insertion material, for example a lithium metal oxide Li$_x$M$^3$O$_y$. Accordingly, the electrode reactions are as follows:

$$Li_3AlH_6 + 3/xLi_xM^3{}_yO_z \Leftrightarrow 6LiH + Al + 3/xM^3{}_yO_z \quad (3)$$

wherein
M$^3$ is a redox-active metal selected from the group Co, Ni, Mn, Fe, V, Cr, Ti;
x is an integer between 1 and 3; and
y and z are integers between 1 and 4.

The following lithium metal oxides are particularly preferred: LiCoO$_2$, LiNiO$_2$, LiMn$_2$O$_4$, Li$_2$MnO$_3$, LiVO$_2$, and mixed metal oxides such as Li(Ni$_{1/3}$Mn$_{1/3}$Co$_{1/3}$)O$_2$, Li(Ni$_{0.85}$Co$_{0.15}$)O$_2$, or LiFe$_{0.5}$Mn$_{1.5}$O$_4$.

Other lithium insertion materials such as lithium phosphates (LiFePO$_4$, LiVPO$_4$, LiMnPO$_4$, for example), lithium silicates (Li$_2$FeSiO$_4$, Li$_2$MnSiO$_4$, Li$_2$CoSiO$_4$, for example), and mixed lithiated fluorometal oxides may be used instead of a metal oxide.

It is also possible to connect the Al-containing hydride anode according to the invention in discharged form to lithium-free cathode materials. In this case, an additional lithium source must be incorporated. This lithium source is either pure lithium metal, for example in powdered form, or an alloy containing lithium metal. Pure lithium metal is preferably used, in which case a mixture of lithium hydride and aluminum forms in situ (during the first charging process):

$$Li_3AlH_6 + 3Li \rightarrow 6LiH + Al \quad (4)$$

Accordingly, the electrode redox reaction is as follows:

$$6LiH + Al + 3/xM^3{}_yO_z \Leftrightarrow Li_3AlH_6 + 3/xLi_xM^3{}_yO_z \quad (5)$$

The theoretical gravimetric capacitance of Li$_3$AlH$_6$ is 1496 Ah/kg, and is thus approximately four times that of graphite.

If the lithium is used in excess in equation (4), a mixture of the metals Li and Al and/or an alloy of elemental aluminum and lithium is/are formed in addition to lithium hydride:

$$Li_3AlH_6 + (3+a)Li \rightarrow 6LiH + AlLi_a \quad (6)$$

wherein
a is a number between 0 and 5, preferably between 0 and 2.

Accordingly, the electrode redox reaction is as follows:

$$6LiH + AlLi_a 3/xM^3{}_yO_z \Leftrightarrow Li_3AlH_6 + aLi + 3/xLi_xM^3{}_yO_z \quad (7)$$

When the connection is made to a lithium-loaded insertion cathode, the hydride anodes are preferably used in the discharged state, i.e., in the form of Li$_3$AlH$_6$. When lithium manganese spinel, for example, is used, according to general equation (3) the galvanic cell has the following electrode configuration (cathode//anode):

$$3LiMn_2O_4//Li_3AlH_6$$

$$Li_3AlH_6+3LiMn_2O_4 \Leftrightarrow 6LiH+Al+3Mn_2O_4 \qquad (3a)$$

According to the invention, it is also possible to connect the discharged hydride anode to a mixture of lithium metal and the partially or completely lithium-free lithium insertion cathode. Accordingly, the configuration is as follows:

$$3Li+Mn_2O_4//Li_3AlH_6$$

The lithiation of the cathode material may be carried out either ex situ (i.e., outside the galvanic cell) or in the installed cell during cyclization.

When a lithium-free (or low-lithium) insertion cathode is combined with the aluminum-based hydride anode according to the invention, the latter is preferably used in the charged state. For example, the aluminum-based hydride anode may be connected to a cathode composed of a Braunstein's modification:

$$3MnO_2//6LiH+Al$$

$$6LiH+Al+3MnO_2 \Leftrightarrow Li_3AlH_6+3LiMnO_2 \qquad (5a)$$

Lastly, it is possible to connect a mixture of $Li_3AlH_6$ and lithium metal to a lithium-free (or low-lithium) insertion cathode, for example $NiO_2$:

$$3NiO_2//Li_3AlH_6+6Li$$

$$Li_3AlH_6+6Li+3NiO_2 \Leftrightarrow 6LiH+Al+3LiNiO_2 \qquad (8)$$

The optimal stoichiometric ratios are indicated in the above reaction equations and electrode configurations. However, it may be appropriate to deviate from these ratios, for example to increase the electrode stability.

For example, the theoretical molar ratio for the charged Al-containing hydride anode according to the invention is 6 LiH:1 Al. If less LiH is used relative to Al, for example only a molar ratio of 4:1, it is not possible to convert all the aluminum to the discharged form (the hexahydride), Instead, a portion of the aluminum remains in elemental form, even after the charging. Accordingly, the electrode configuration and the charging-discharging equation are as follows when a Braunstein's modification is used as cathode:

$$2MnO_2//4LiH+Al$$

$$4LiH+Al+2MnO_2 \Leftrightarrow \tfrac{2}{3}Li_3AlH_6+\tfrac{1}{3}Al+2LiMnO_2 \qquad (5b)$$

The aluminum which does not participate in the redox process results in a lower change in volume of the anode during cyclization; i.e., the aluminum stabilizes the anode, thus further improving the cycle stability.

If the hydride anode material according to the invention is used in the charged state, the molar ratio of LiH to Al or to $AlLi_a$ may assume values between 0.5:1 and 10:1. Similarly, the molar ratio of $Li_3AlH_6$ to Li may assume values between 1:1 and 1:20.

If the Al-containing hydride anode material according to the invention is used in discharged form (i.e., as $Li_3AlH_6$), it is likewise possible to use the Al-containing hydride anode material in a mixture with aluminum and/or LiH Molar ratios of $Li_3AlH_6$, Al and LiH according to the invention are generally in the range between 1:0:0 and 1:0.1-2:0.1-12.

The Al-containing hydride anode material according to the invention is preferably present in powdered form. The particle size is generally <100 μm, particularly preferably <30 μm. Conductivity-enhancing additives, for example graphite, conductive carbon black, or finely divided metals (Ti powder, for example), are preferably admixed with the hydride anode materials according to the invention.

Types of electrolytes known to one skilled in the art (liquid, gel, polymer, and solid electrolytes) are suitable as electrolytes. The lithium salts containing weakly coordinating, oxidation-stable anions which are soluble in or otherwise introducible into such products are used as conducting salt. For example, these include in particular $LiPF_6$, lithium fluoroalkyl phosphates, $LiBF_4$, imide salts ($LiN(SO_2CF_3)_2$, for example), $LiOSO_2CF_3$, methide salts ($LiC(SO_2CF_3)_3$, for example), $LiClO_4$, lithium chelatoborates (LiBOB, for example), lithium fluorochelatoborates ($LiC_2O_4BF_2$, for example), lithium chelatophosphates (LiTOP, for example), and lithium fluorochelatophosphates ($Li(C_2O_4)_2PF_2$, for example). Particularly preferred are salts containing anions which are stable against anionic dissociation and free of fluorine. It has surprisingly been found that when fluorine-free conducting salts such as chelatoborates and chelatophosphates are used, electrolytes are much more stable in contact with the aluminum-based hydride anodes according to the invention, so that their use results in galvanic cells having much better safety characteristics than is the case when salts containing labile anions ($LiPF_6$, for example) are used. It is presumed that, due to anionic dissociation according to:

$$LiPF_6 \rightarrow LiF+PF_5 \qquad (9),$$

$LiPF_6$-based electrolytes form reactive species (the Lewis acid $PF_5$ and/or secondary products therefrom) which are able to react exothermically with the aluminum-based hydride anodes according to the invention, even at relatively low temperatures.

The discharged hydride anode material is produced according to the prior art, for example by reacting lithium aluminum hydride with organolithium compounds according to $$2C_nH_{2n+1}Li+LiAlH_4 \rightarrow Li_3AlH_6+2C_nH_{2n}$$

(R. Ehrlich, J. Amer. Chem. Soc. 88 (1966) 858-860).

The charged Al-containing hydride anode material according to the invention is produced, for example, by mixing lithium hydride and aluminum powder. If the individual components do not have the desired particle size distribution, i.e., they are too coarse, for example, they may be ground, separately or particularly preferably in a mixture. This procedure is carried out, with the exclusion of air and moisture, under a hydrogen or inert gas atmosphere, for example using a ball mill or rod mill. In one particularly preferred method variant, a conductivity-enhancing additive is added to and ground with the mixture.

A particularly preferred fine material is obtained by reacting lithium metal with lithium aluminum hydride in an aprotic polar solvent according to:

$$LiAlH_4+3Li \rightarrow 4LiH+Al$$

Ethers, for example diethyl ether, dibutyl ether, methyl tert-butyl ether, tetrahydrofuran, or methyltetrahydrofuran, are preferably used as solvent.

Alternatively, this reaction may be carried out in the absence of solvent in an autoclave at temperatures above 150° C.

Another particularly preferred method for preparing a lithium hydride/aluminum mixture is the reaction of $Li_3AlH_6$ with lithium metal:

$$Li_3AlH_6+3Li \rightarrow 6LiH+Al$$

This reaction is preferably carried out either in a grinding process or thermally within the substance (i.e., in the absence of solvent) at temperatures above the melting point of lithium (180.5° C.). A mixture of elemental Li and Al or a Li/Al alloy is obtained when the lithium is used in excess.

The invention relates in particular to:
a galvanic element composed of an aluminum-based hydride anode, a cathode containing a transition metal, and an aprotic lithium electrolyte;
preferably a galvanic element in which the aluminum-based hydride anode in the discharged state contains or is composed of a binary or ternary aluminum hydride of the formula $(M^1)_m(M^2)_{3-m}AlH_6$, wherein $M^1$ and $M^2$ are an alkali element independently selected from Li, Na, and K; m is a number between 1 and 3; and n is a number $\geq 3$;
particularly preferably a galvanic element in which the binary or ternary aluminum hydride is $Li_3AlH_6$;
very particularly preferably a galvanic element in which a partially or completely lithiated lithium insertion material is used as cathode (positive electrode composition);
more preferably a galvanic element in which a lithium metal oxide, a lithiated phosphate, a lithiated silicate, or a mixed lithiated fluorometal oxide is used as lithium insertion material.

The invention further relates to:
a method for producing a lithium battery, in which an anode containing a binary or ternary metal aluminum hydride of the general formula $(M^1)_m(M^2)_{3-m}AlH_6$, wherein $M^1$ and $M^2$ are an alkali element independently selected from Li, Na, and K; m is a number between 1 and 3; and n is a number 3, is brought into contact with a partially or completely lithiated lithium insertion material by means of a separator/electrolyte composite;
preferably a method in which the lithium insertion material represents a lithium metal oxide, a lithium phosphate, a lithium silicate, or a lithiated fluorometal oxide, or a mixture of the named substance groups;
particularly preferably a method in which an anode containing a mixture of lithium hydride and aluminum metal, an aluminum-lithium alloy, and/or a mixture of the metals aluminum and lithium is brought into contact with a partially or completely delithiated or lithium-free lithium insertion material by means of a separator/electrolyte composite;
very particularly preferably a method in which the lithium insertion material represents a lithium metal oxide, a lithium phosphate, a lithium silicate, or a lithiated fluorometal oxide, or a mixture of the named substance groups.

The invention further relates to:
a negative electrode composition for a galvanic element which in the discharged state contains or is composed of a binary or ternary aluminum hydride of the formula $(M^1)_m(M^2)_{3-m}AlH_6$, wherein $M^1$ and $M^2$ are an alkali element independently selected from Li, Na, and K; m is a number between 1 and 3; and n is a number $\geq 3$;
preferably a negative electrode composition in which the binary or ternary aluminum hydride is $Li_3AlH_6$;
particularly preferably a negative electrode composition which in the charged state contains or is composed of lithium hydride and aluminum metal;
very particularly preferably a negative electrode composition which contains conductivity-enhancing additives, for example graphite or conductive carbon black.

Lastly, the invention relates to:
the preparation of a mixture of lithium hydride and aluminum metal by reacting lithium aluminum hydride with lithium metal in a polar, aprotic solvent; and
preferably the preparation of a mixture of lithium hydride and aluminum metal by reacting lithium hexaaluminum hydride with lithium metal either in a grinding process or thermally, at temperatures above 180.5° C.

The invention is explained below with reference to two examples and three figures.

EXAMPLES OF PREFERRED EMBODIMENTS

Example 1

Thermal Stability of a Mixture of $Li_3AlH_6$ and Various Electrolyte Solutions (DSC Tests)

An apparatus from Systag, Switzerland (Radex system) was used for differential scanning calorimetry (DSC) tests. Approximately 2 g electrolyte solvent and 0.1 g $Li_3AlH_6$ were weighed into the stainless steel sample containers, under a protective gas atmosphere. The containers were sealed tight with a lid connected to a pressure gauge. The samples were then heated at a rate of 45 K/h to 200° C. (13% solution of $LiPF_6$ in EC/EMC (1:1)) and to 250° C. (13% LiBOB solution in EC/EMC (1:1)).

The experiment showed that the anode material $Li_3AlH_6$ according to the invention in $LiPF_6$ electrolyte was stable to approximately 80° C. Above this temperature, the mixture decomposed with intense heat release and pressure buildup (100 bar). In contrast, the mixture containing the lithium bis(oxalato)borate (LiBOB) was stable to above 200° C.

Example 2

Charging-discharging Behavior of $Li_3AlH_6$

All electrochemical experiments were conducted in an Ar-filled glove box. Three-electrode glass cells containing the Al hydride material as anode, lithium metal as cathode, and likewise lithium metal as reference electrode were produced. The anode was prepared by mixing the active material ($Li_3AlH_6$ or LiH/Al mixture) with a graphite-based conductivity additive and PTFE. The anode mixture was pressed onto a nickel mesh. A 12% solution of $LiPF_6$ in EC/DMC was selected as electrolyte.

Figure 1:
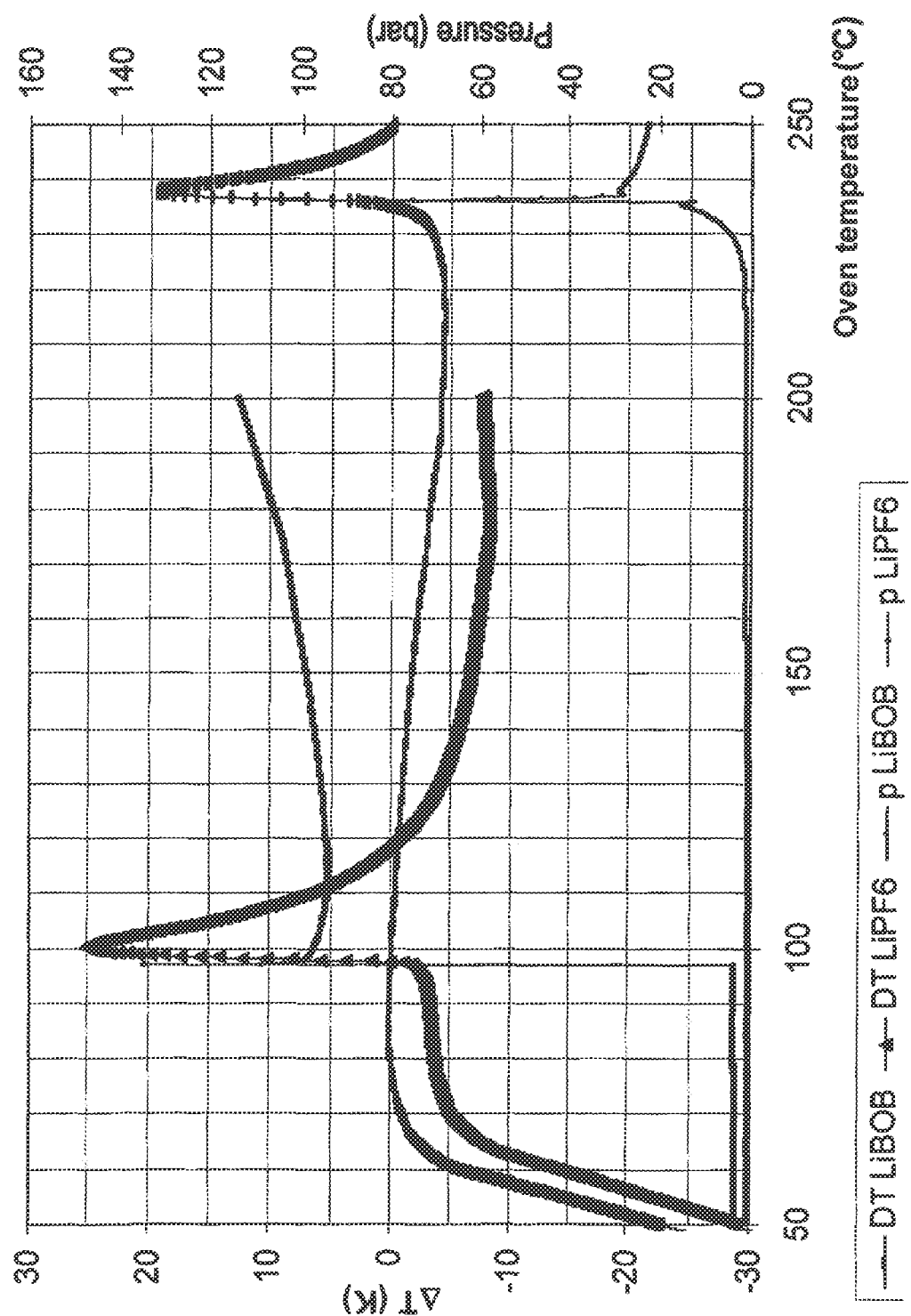
FIG. 1: shows the thermal stability of $Li_3AlH_6$ in contact with electrolyte solutions (Radex experiments)
Figure 2:
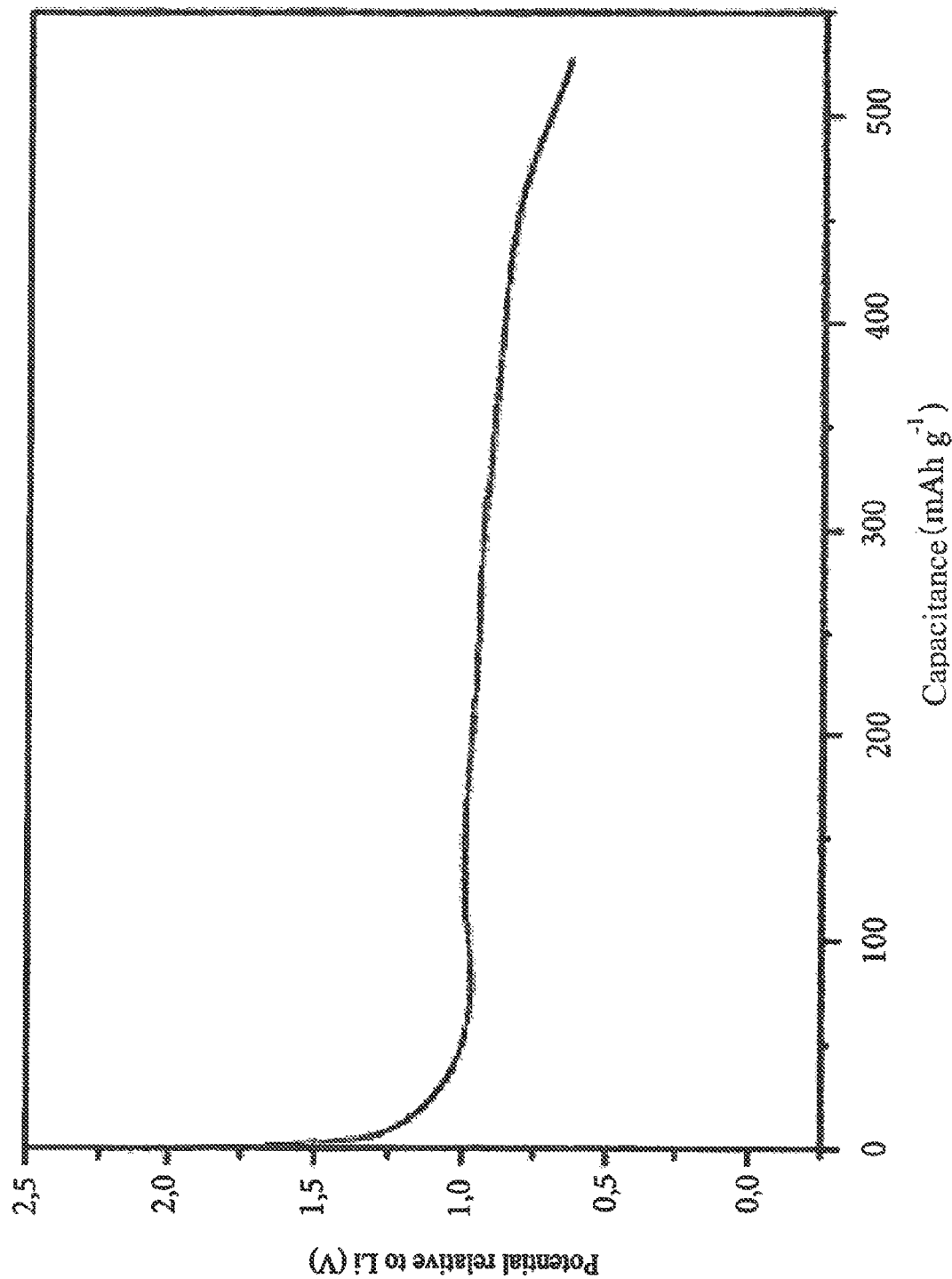
FIG. 2: shows the first charging of $Li_3AlH_6$ in the potential range of 0.6-3 V.

Lithium incorporation at a potential of approximately 1 V is apparent in FIG. 2.

Figure 3:
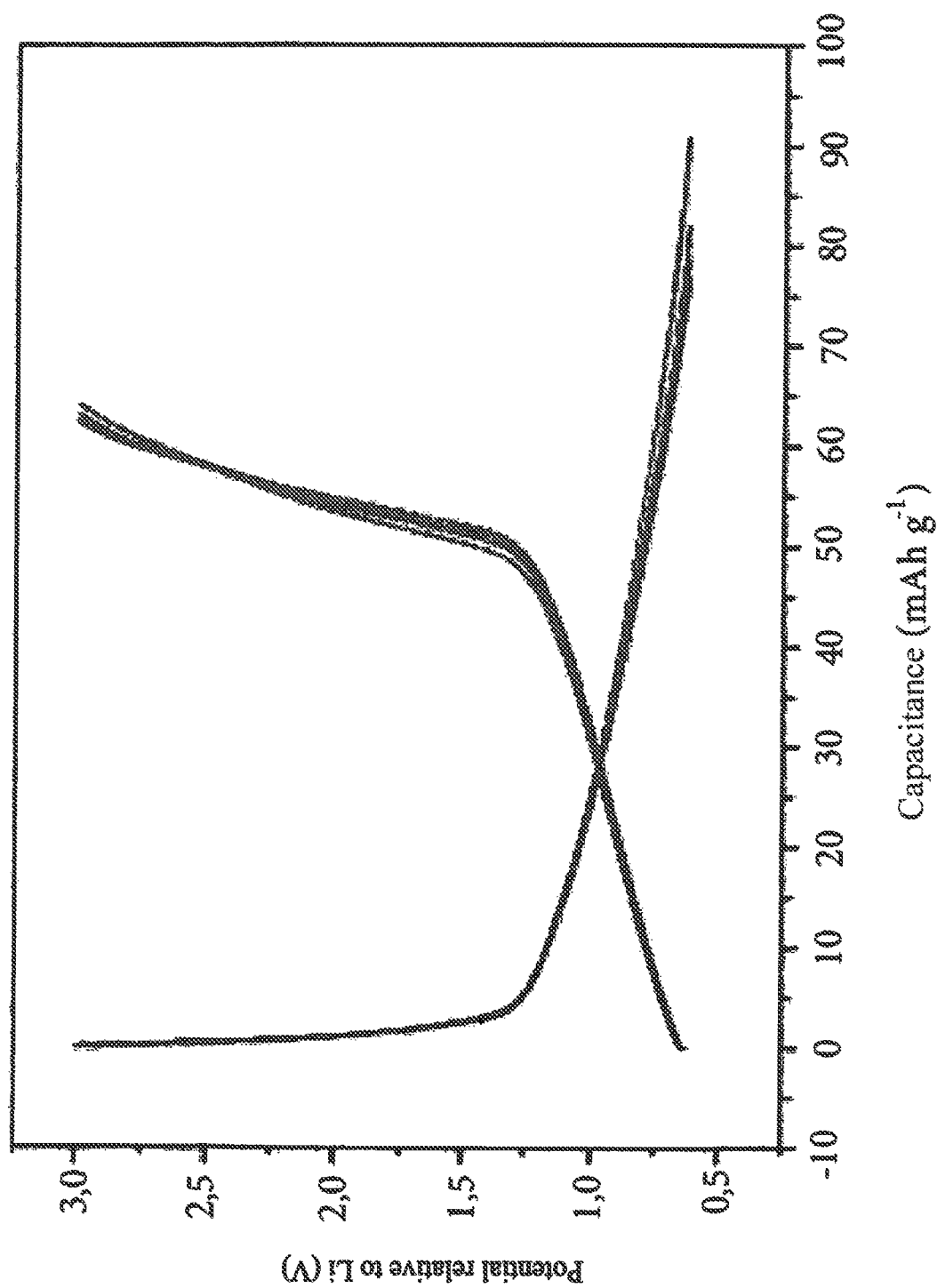
FIG. 3: shows the second through fifth charging-discharging cycles of $Li_3AlH_6$ in the potential range of 0.6-3 V.

FIG. 3 demonstrates that the lithium incorporation is reversible. The relatively low charge/discharge capacitance is due to the non-optimized electrode preparation (the electronic contact between the particles is not adequately ensured).

The invention claimed is:
1. A galvanic element comprising an aluminum-based hydride anode, a cathode containing a transition metal, and an aprotic lithium electrolyte, wherein the aluminum-based hydride anode in the discharged state comprises a binary or ternary hydride of the formula $(M^1)_m(M^2)_{3-m}AlH_6$, wherein $M^1$ and $M^2$ are an alkali element independently selected from Li, Na, and K;

m is a number between 1 and 3.

2. A galvanic element according to claim 1, wherein at least one of $M^1$ and $M^2$ are Li.

3. A galvanic element comprising an aluminum-based hydride anode, a cathode containing a transition metal, and an aprotic lithium electrolyte, wherein the binary or ternary aluminum hydride is $Li_3AlH_6$.

4. A galvanic element according to claim 1, wherein a partially or completely lithiated lithium insertion material is a cathode.

5. A galvanic element according to claim 1, wherein the lithium insertion material is selected from the group consisting of a lithium metal oxide, a lithiated phosphate, a lithiated silicate and a mixed lithiated fluorometal oxide.

6. A method for producing a lithium battery, wherein an anode containing a binary or ternary metal aluminum hydride of the general formula $(M^1)_m(M^2)_{3-m}AlH_6+nLi$, wherein $M^1$ and $M^2$ are an alkali element independently selected from Li, Na, and K;

m is a number between 1 and 3; and is brought into contact with a partially or completely lithiated lithium insertion material by means of a separator/electrolyte composite.

7. A method according to claim 6, wherein the lithium insertion material represents a lithium metal oxide, a lithium phosphate, a lithium silicate, or a lithiated fluorometal oxide, or a mixture of the named substance groups.

8. A method according to claim 6, wherein an anode containing a mixture of lithium hydride and aluminum metal, an aluminum-lithium alloy, and/or a mixture of the metals aluminum and lithium is brought into contact with a partially or completely delithiated or lithium-free lithium insertion material by means of a separator/electrolyte composite.

9. A method according to claim 8, wherein the lithium insertion material is a lithium metal oxide, a lithium phosphate, a lithium silicate, or a lithiated fluorometal oxide, or a mixture of the named substance groups.

10. A negative electrode composition for a galvanic element, wherein the negative electrode composition in the discharged state contains or is composed of a binary or ternary aluminum hydride of the formula $(M^1)_m(M^2)_{3-m}AlH_6$, wherein $M^1$ and $M^2$ are an alkali element independently selected from Li, Na, and K;

m is a number between 1 and 3; and n is a number $\geq 3$.

11. A negative electrode composition according to claim 10, wherein the binary or ternary aluminum hydride is $Li_3AlH_6$.

12. A negative electrode composition according to claim 10, wherein the negative electrode composition in the charged state contains or is composed of lithium hydride and aluminum metal.

13. A negative electrode composition according to claim 10, wherein the negative electrode composition contains conductivity-enhancing additives, for example graphite or conductive carbon black.

* * * * *